US012671502B2

(12) United States Patent
Bacco et al.

(10) Patent No.: US 12,671,502 B2
(45) Date of Patent: Jun. 30, 2026

(54) WEAK PULSE DETECTION FOR DISCRETE-VARIABLE QUANTUM KEY DISTRIBUTION RECEIVER AND METHOD

(71) Applicant: QTI SRL, Florence (IT)

(72) Inventors: Davide Bacco, Codevigo (IT);
Francesco Saverio Cataliotti, Florence (IT); Paolo De Natale, Prato (IT);
Tommaso Occhipinti, Vicenza (IT);
Ilaria Vagniluca, Florence (IT);
Alessandro Zavatta, Florence (IT)

(73) Assignee: QTI S.r.l., Florence (IT)

( * ) Notice: Subject to any disclaimer, the term of this patent is extended or adjusted under 35 U.S.C. 154(b) by 195 days.

(21) Appl. No.: 18/562,854

(22) PCT Filed: May 24, 2022

(86) PCT No.: PCT/EP2022/064113
§ 371 (c)(1),
(2) Date: Nov. 21, 2023

(87) PCT Pub. No.: WO2022/248503
PCT Pub. Date: Dec. 1, 2022

(65) Prior Publication Data
US 2024/0243816 A1     Jul. 18, 2024

(30) Foreign Application Priority Data
May 25, 2021    (IT) ........................ 102021000013571

(51) Int. Cl.
H04B 10/70         (2013.01)
(52) U.S. Cl.
CPC .................................... H04B 10/70 (2013.01)
(58) Field of Classification Search
CPC .................................................... H04B 10/70
(Continued)

(56) References Cited

U.S. PATENT DOCUMENTS

2016/0047643 A1* 2/2016 Yuan ..................... H01S 5/4006
                                                              398/25
2018/0241553 A1* 8/2018 Lucamarini ........... H04L 9/0858

FOREIGN PATENT DOCUMENTS

CN          102868520 A  *  1/2013
CN          105024809 A  *  11/2015
(Continued)

OTHER PUBLICATIONS

Shcherbatenko et al; Coherent Detection of Weak Signals with Superconducting Nanowire Single Photon Detector at the telecommunication wavelength; 2017, Photon Counting Applications, SPIE, pp. 1-12. (Year: 2017).*
(Continued)

*Primary Examiner* — Amritbir K Sandhu
(74) *Attorney, Agent, or Firm* — Carmel Patent Agency; Robert Ballarini

(57) ABSTRACT

A receiver for receiving weak light pulses in a discrete-variable encoding quantum key distribution system, includes:
  an optical coupler having first and second inputs and outputs and is configured to be connected to a quantum channel to receive the weak pulses at the first input, and local oscillator signals at the second input;
  a local oscillator laser adapted to generate the local oscillator signals,
  a laser locking system for locking the difference between wavelengths to a fixed value, so that the difference remains constant in time;
  a synchronizer connected to the local oscillator laser so that the local oscillator laser emits a local oscillator signal at a given time;
  first and second photodetectors, the first and second photodetectors connected to the first and second outputs, respectively;
(Continued)

an electronic circuit configured to obtain a difference signal;

a filter adapted to filter the difference signal, generating a filtered signal; and a discriminator.

18 Claims, 9 Drawing Sheets

(58) Field of Classification Search
USPC ........................................................ 398/189
See application file for complete search history.

(56) References Cited

FOREIGN PATENT DOCUMENTS

| EP | 2081317 A2 * | 7/2009 | ........... H04L 9/0858 |
|---|---|---|---|
| EP | 2365647 A1 * | 9/2011 | ............. H04B 10/53 |
| EP | 3413503 A1 * | 12/2018 | ........... H04L 9/0894 |

OTHER PUBLICATIONS

Namekata et al; High-rate quantum key distribution over 100 km using ultra-low-noise, 2-GHz sinusoidally gated InGaAs/InP avalanche photodiodes; 2011, Optical society of America; pp. 1-8. (Year: 2011).*

Bing Qi: "The BB84 quantum key distribution using conjugate homodyne detection", arxiv.org, Cornell University Library, 201 Olin Library Cornell University Ithaca, NY 14853, Jan. 10, 2021.

Ignatius William Primaatmaja et al: "Discrete-variable quantum key distribution with homodyne detection", arkiv.org, Cornell University Library, 201 Olin Library Cornell University Ithaca, NY 14853, Sep. 1, 2021.

* cited by examiner

FIG. 2a

WEAK PULSE DETECTION FOR DISCRETE-VARIABLE QUANTUM KEY DISTRIBUTION RECEIVER AND METHOD

The present invention relates to a quantum key distribution receiver for detecting the presence or the absence of a quantum state, the quantum state belonging to a cryptographic key created using a quantum communication protocol with N-dimensional quantum states.

Quantum communications, by exploiting single photons or weak pulses of light, give rise to novel types of applications, not possible with standard optical communication. For example, the possibility of distributing cryptographic keys in an unconditionally secure way is currently the most relevant application from a commercial point of view.

Quantum cryptography offers indeed the possibility of distributing cryptographic keys between two or more users, by exploiting the laws of quantum mechanics. These keys allow secure communication of data in real time by using encryption algorithms.

Quantum states can be created using different degrees of freedom, for example polarization, time, space, phase, frequency and others or a combination of them. One of the most effective and suitable system for today's telecommunication networks is time encoding. In time encoding, different time-slots are defined and the different quantum states can be distinguished according to the time of arrival of the photon (or the weak light pulse). The basis of quantum states associated to the encoded key bits is called computational basis.

In addition to the computational basis, it is also necessary to prepare a second basis of quantum states, the so-called superposition basis, in order to certify the security of the quantum protocol.

Therefore, the coding of information is performed on very attenuated optical signals, with a light mean intensity even below that of individual photons. These very weak signals are called qubits (or quantum bits) and their use allows exploiting the interesting properties of quantum mechanics, as happens for example for the secure transmission of private information through an untrusted channel. To decode this information, the receiver must make a measurement of the quantum state carried by each qubit. In particular, in discrete-variable quantum communication systems, information is usually encoded in the state of polarization, in the time of arrival (time-bin) or in the relative phase of strongly attenuated laser signals.

In order to detect these qubits, the receiver generally uses measuring equipment containing one or more single-photon detectors, or photo-detection devices capable of signaling the arrival of very weak light signals. The most used wavelengths are those typical of optical telecommunications, such as windows at 1310 nm and 1550 nm used for signal propagation in optical fibers, or at 800/1550 nm for signal propagation in the atmosphere. Single-photon detectors based on semiconductors (SPAD) include avalanche photodiodes operating in the breakdown regime. Another type of single-photon detectors is based on superconducting materials (SNSPD), in which the arrival of a photon is signaled by the momentary interruption of superconductivity, caused by the absorbed photon. SNSPD devices generally work better than SPADs, but need to be cooled to cryogenic temperatures<3° K (while for SPADs a thermoelectric cooling is sufficient at about 183° K-253° K).

In general, however, all these devices have considerable dimensions, high energy consumption and a high price, especially for infrared wavelengths and superconducting detectors. This constitutes a serious limitation to the development and diffusion of quantum communication technologies, in particular for discrete-variable encoding. Furthermore, these limitations also hinder their potential integration into existing and currently used telecommunications fiber optic infrastructures and networks. In addition, both SPADs and SNSPDs are highly susceptible to reading errors caused by noise signals. The noise can originate both from the intrinsic material impurities and from surrounding environment (such as sunlight, black body radiation and scattered light). The latter case is common when the same fiber is used simultaneously for the transport of classical and quantum signals.

Examples of a key recovery apparatus and method in the field of quantum communication are disclosed in the patent application EP 3413503 A1. An high-speed pulsed homodyne detector in optical communication wavelength band is described in EP 2365647 A1.

There is therefore a need for a detector or a method to detect weak pulses of light that it is accurate and at the same time relatively inexpensive.

There is also a need for a detector or a method to detect weak pulses of light that it is accurate and may work at room temperature.

There is also a need for a detector or a method to detect weak pulses of light that it is accurate and compatible with existing telecommunication systems and devices.

The invention may satisfy one or more of the above needs.

According to an aspect, the invention relates to a receiver for receiving weak pulses of light in a quantum key distribution system with discrete-variable encoding, the receiver comprising:

An optical coupler having a first and a second input and a first and second output, the optical coupler being adapted to be connected to a quantum channel to receive the weak pulses at the first input, each weak pulse having duration T and wavelength $\lambda_{wp}$, and local oscillator signals at the second input;

A local oscillator laser adapted to generate the local oscillator signals, each local oscillator signal being an impulse of duration T and wavelength $\lambda_{LO}$, wherein the difference between $\lambda_{LO}$ and $\lambda_{wp}$ is such that:

$$\frac{1}{T} < \left| \frac{c}{\lambda_{wp}} - \frac{c}{\lambda_{LO}} \right| \leq 100 \text{ GHz}$$

A laser locking system for locking the difference between the $\lambda_{LO}$ and $\lambda_{wp}$ wavelengths to a fixed value, so that the difference remains constant in time;

A synchronizer connected to the local oscillator laser so that the local oscillator laser emits a local oscillator signal at a given time for which the weak pulse and the local oscillator signal reach the first and second input, respectively, at the same time;

A first and a second photodetector, the first and second photodetector being connected to the first and second output, respectively, of the optical coupler and emitting a first and a second electric signal, the first and second electric signal being function of the interference between the weak pulse and the local oscillator signal in the optical coupler;

An electronic circuit configured to obtain a difference signal, the difference signal being function of the difference between the first electric signal emitted by the first photodetector and the second electric signal emitted by the second photodetector;

A filter adapted to filter the difference signal, generating a filtered signal which includes a portion of the difference signal having a frequency in a frequency range around a carrier frequency f, where $$f = \left| \frac{c}{\lambda_{wp}} - \frac{c}{\lambda_{LO}} \right|$$

A discriminator, the discriminator being configured to determine whether the filtered signal has a value function of the amplitude above a fixed threshold.

According to a further aspect, the invention relates to a receiver for receiving weak pulses in a quantum key distribution system with discrete-variable encoding, the receiver comprising:

A optical coupler having a first and a second input and a first and second output, the optical coupler being adapted to be connected to a quantum channel to receive the weak pulses at the first input, each weak pulse having duration T and wavelength $\lambda_{wp}$, and local oscillator signals at the second input;

A local oscillator laser adapted to generate the local oscillator signals, each local oscillator signal being an impulse of duration T and wavelength $\lambda_{LO}$ identical to $\lambda_{wp}$;

A phase variator, the phase variator being adapted to modulate, with a modulation frequency, the phase of the weak pulse or of the local oscillator signal before they interfere in the optical coupler;

A synchronizer connected to the local oscillator laser so that the local oscillator laser emits a local oscillator signal at a given time for which the weak pulse and the local oscillator signal reach the first and second input, respectively, at the same time;

A first and a second photodetector, the first and second photodetector being connected to the first and second output, respectively, of the optical coupler and emitting a first and a second electric signal, the first and second electric signal being function of the interference between the weak pulse and the local oscillator signal in the optical coupler;

An electronic circuit configured to obtain a difference signal, the difference signal being function of the difference between the first electric signal emitted by the first photodetector and the second electric signal emitted by the second photodetector;

A filter adapted to filter the difference signal, generating a filtered signal that includes a portion of the difference signal having a frequency in a frequency range around the modulation frequency that was previously applied by the phase variator;

A discriminator, the discriminator being configured to determine whether the filtered signal has a value function of the amplitude above a fixed threshold.

The features of the receiver according to the invention allow the presence and absence of weak pulses to be detected, in particular allow the receiver to discriminate the presence of a weak pulse of light without extracting any information contained in it (e.g. amplitude), the receiver comprising a discriminator which is configured to determine whether the filtered signal has a value function of the amplitude above a fixed threshold. Therefore, the receiver according to the invention does not require the use of phase frequency information to extract the required information.

On the contrary, the apparatus of EP 3413503 A1 does not comprise an element having the features of the receiver's discriminator according to the invention. Indeed, EP 3413503 A1 does not disclose a fixed threshold and, consequently, a discriminator configured to determine whether a filtered signal has a value function of the amplitude above the fixed threshold cannot be described by EP 3413503 A1. As of matter of fact, EP 3413503 A1 relates to a key recovery apparatus which requires the phase frequency information between a local oscillator optical signal and a reference optical signal to extract the original key. Thus, conversely to the receiver of the invention, the key recovery apparatus of EP 3413503 A1 requires information from the carrier recovery unit that provides phase frequency information.

In addition, the apparatus of EP 3413503 A1 does not seem to be suitable for a quantum key distribution system with discrete-variable encoding, since the key recovery procedure described in EP 3413503 A1 needs phase frequency information that is not present in discrete variable QKD protocols. Moreover, the apparatus of EP 3413503 A1 is not able to extract time information necessary for time-bin encoding of DV QKD.

According to a further aspect, the invention relates to a method to detect the presence or the absence of weak pulses in a quantum key distribution system with discrete-variable encoding, the method comprising:

Receiving a weak pulse (i.e. a quantum signal) from a quantum channel having duration T and wavelength $\lambda_{wp}$;

Generating a local oscillator signal having duration T and wavelength $\lambda_{LO}$, wherein the difference between $\lambda_{LO}$ and $\lambda_{wp}$ is such that:

$$\frac{1}{T} < \left| \frac{c}{\lambda_{wp}} - \frac{c}{\lambda_{LO}} \right| \leq 100 \text{ GHz};$$

Keeping the difference between $\lambda_{LO}$ and $\lambda_{wp}$ constant in time;

Inputting to a first and second input of an optical coupler at the same time the weak pulse and the local oscillator signal;

Creating an interference signal between the weak pulse and the local oscillator signal using the optical coupler;

Detecting the interference signal at a first and at a second output of the optical coupler;

Emitting a first and a second electric signal function of the detected interference signal; Subtracting the first and the second electric signal obtaining a difference signal;

Filtering the difference signal generating a filtered signal which includes a portion of the difference signal having a frequency in a frequency range around a carrier frequency f, where $$f = \left| \frac{c}{\lambda_{wp}} - \frac{c}{\lambda_{LO}} \right|$$

Comparing the filtered signal with a threshold;

Determining that a weak pulse has been received if a parameter of the filtered signal is above the threshold.

According to another aspect, the invention relates to a method to detect the presence or the absence of weak pulses in a quantum key distribution system with discrete-variable encoding, the method comprising:

Receiving a weak pulse from a quantum channel having duration T and wavelength $\lambda_{wp}$;

Generating a local oscillator signal having duration T and wavelength $\lambda_{LO}$ identical to $\lambda_{wp}$;

Inputting to a first and second input of an optical coupler at the same time the weak pulse and the local oscillator signal;

Creating an interference signal between the weak pulse and the local oscillator signal using the optical coupler;

modulating the phase of the weak pulse or of the local oscillator signal before interference in the optical coupler, resulting in a modulated interference signal;

Detecting the interference signal at a first and at a second output of the optical coupler;

Emitting a first and a second electric signal function of the detected interference signal;

Subtracting the first and the second electric signal obtaining a difference signal;

Filtering the difference signal generating a filtered signal which includes a portion of the difference signal having a frequency in a frequency range around the modulation frequency;

Comparing the filtered signal with a threshold;

Determining that a weak pulse has been received if a parameter of the filtered signal is above the threshold.

It should be noted that the method according to the invention allows to detect the presence and absence of weak pulses, without extracting any information contained in the weak pulse of light. The method according to the invention does not require the use of phase frequency information to extract the required information.

It should be noted that EP 3413503 A1 does no comprises at least the steps of comparing and determining of the method according to the invention since the invention of EP 3413503 A1 is referred to the continues variable protocols where the information sabot the amplitude of the quantum signal contain the information about the key.

The technical effect obtained by these steps is to have a well-defined pulsed electrical signal that heralds the detection of a weak pulse. The electrical pulse identifies the presence of the weak pulse in a well-defined time. This apparatus applies, preferably, in discrete variable QKD protocols that use time-bin encoding.

The feature related to the difference between the wavelength of the local oscillator pulse $\lambda_{LO}$ and the wavelength of the weak pulse $\lambda_{wp}$ which is such that:

$$\frac{1}{T} < \left| \frac{c}{\lambda_{wp}} - \frac{c}{\lambda_{LO}} \right| \leq 100 \text{ GHz};$$

preferably, this difference being such that:

$$\frac{1}{T} < \left| \frac{c}{\lambda_{wp}} - \frac{c}{\lambda_{LO}} \right| \leq 10 \text{ GHz},$$

puts an upper bound to the frequency difference between the weak pulse and the local oscillator.

A particularly efficient method and receiver is obtained by this feature.

Indeed, a difference between the weak pulse and the local oscillator less than 100 GHz, preferably less than 10 GHz, cause the electronic circuit of the receiver according to the invention to have a signal-to-noise ratio high enough (preferably the signal-to-noise ratio is equal to or greater than 10) to observe the weak pulse from the photodetectors, thereby avoiding or at least reducing that false detection events occur.

In this case, the electronic circuit corresponds to an ultra-low noise circuit.

On the contrary, a worst signal-to-noise ratio implies a higher probability of false detection events because the noise signal can pass the discriminator.

In addition, it should be noted that the optimal operation of a low-noise electronics in the electronics frequency range up to 10 GHZ, so within the frequency difference between the weak pulse and the local oscillator.

The present invention relates to a method and an apparatus to detect weak pulses of light, with Poissonian photon number distribution. These weak pulses are a practical and inexpensive way to probabilistically create single-photon pulses. The weak pulses are created for example using a laser, which is then attenuated and phase-randomized, and are largely employed in quantum cryptography systems for discrete-variable quantum key distribution (QKD). In any case, the present invention is independent on how these weak pulses states are generated. Due to the probabilistic (Poissonian) nature of the number of photons in a time interval for a weak pulse, there is no way to create a single-photon pulse with certainty so the probabilities of emission of both multi-photon and vacuum pulses must be managed. Multi-photon pulses must be avoided in QKD systems. This is usually accomplished by highly attenuating the source so that the average number of photons per pulse, u, falls well below 1.

In the present invention, the weak pulses considered, that is, the pulses received by the receiver of the invention, are states in which $\mu \approx 1$ and $\mu < 1$. The present invention does not work if number states or Fock states are considered (eigenstates of the photon number operator). Thus the "signals" received by the receiver or in the method of the invention are weak pulses were u is approximately 1 or smaller than 1.

Further, with weak pulses "on light", weak pulses of an electromagnetic radiation having a given wavelength detailed below are meant.

Furthermore, the present invention deals with discrete-variable quantum communication employing weak pulses acting as information carrier. The exchanged quantum states are encoded into the polarization, phase or time bin of the transmitted qubits and the secret key is established upon detection of the individual "pulses" (uncorrelated weak pulses of light with Poissonian photon number distribution). Therefore, the receiver of the invention receives weak pulses which act as information carrier in a QKD protocol.

The receiver of the invention includes an optical coupler. The optical coupler may include for example a beam splitter. The optical coupler includes a first and a second arm. Due to the presence of the two arms, the optical coupler defines a first input and a second input. The optical coupler further includes a first output and a second output. The first and second arms define identical optical paths for balanced detection.

According to an embodiment of invention, the optical coupler is a 50% optical coupler. Preferably, the optical coupler includes a 50% beam splitter.

A 50% optical coupler has the advantage to optimize the balanced measurements between the two photodiodes, by preventing the difference signal from classical noise.

The receiver of the invention is adapted to be connected to a quantum channel. The quantum channel may be connected to the first input of the optical coupler. The quantum channel is adapted to transport the weak pulse containing the information of the quantum key. The quantum channel can be for example a physical channel, such as an optical fiber, or a wireless channel. The information shared using the quantum channel is preferably only the quantum key, which is further used to encrypt all the information to be shared between the two parties. The information encrypted using the quantum key is then shared through a "classical channel". The quantum channel and the classical channel may be in some embodiment the same channel, such as an optical fiber.

The receiver is adapted to receive as input weak pulses in form of pulses of light, that is of electromagnetic radiation having a duration T and a wavelength $\lambda_{wp}$. The receiver of the invention determines whether the signal received is a weak pulse or it is simply noise. In other words, the output of the receiver is the determination whether the signal received is a weak quantum state, for example as part of a quantum state of a cryptographic quantum key, or a noise signal. The receiver has thus the function of a "single-photon detector". In the following, the portion of the receiver which is dedicated to detect whether a weak pulse has been received, is called "single-photon detector" portion.

The receiver of the invention does not determine the content of the information contained in the weak pulse, it determines only whether a weak pulse is present. If the weak pulse is according to a polarization protocol or path protocol or others, additional elements are present in the receiver upstream of the "single-photon detector" portion in order to determine the content of the information encoded in this degree of freedom. For example, in the polarization encoding, a polarized optics is necessary to project the quantum states. In case of phase or time-bin encoding, a delay line interferometer will be used for the measurement.

A transmitter can for example emit the weak pulses received by the receiver of the invention. The transmitter may emit the weak pulses by means of a laser. Each weak pulses is prepared as a quantum state, and the set of different quantum states is prepared in a typical quantum communication protocol.

In addition to the weak pulses purposely received, the receiver can also receive noise as input signals. Noise signals are substantially inevitable, although their number and intensity may be minimized using known techniques.

There are two main categories of noise that are intrinsic in the detector: shot noise and thermal noise. With "shot" noise, the typical optical noise of a laser is meant. The thermal noise is the "electronic" noise of the photodetector and of the overall electronics of the receiver.

A review of the shot noise can be found for example in: Beenakker, C. W. J., and Christian Schönenberger. "Quantum shot noise." (2003).

Thermal noise, also called Johnson-Nyquist noise, is the noise generated by the thermal agitation of the charge carriers (usually the electrons) inside an electrical conductor at equilibrium, which happens regardless of any applied voltage.

The receiver of the present invention is adapted to minimize the number of dark counts which take place while receiving the weak pulses. The dark count rate is the average rate of registered counts (i.e. weak pulse signal present according to the receiver) without any incident weak pulse.

The weak pulses which are received by the receiver of the invention are polarized and can be in any state of polarization. All the weak pulses received by the receiver of the invention or in the method of the invention preferably have all the same duration T. Preferably, the weak pulses received by the receiver of the invention or in the method of the invention also have all the same wavelength. For example, the weak pulses are generated by a transmitter including a pulsed laser.

The receiver is also adapted to be connected to an output of a laser source, called local oscillator laser source. The output of the local oscillator source is connected to the second input of the optical coupler. This local oscillator (LO) laser source generates local oscillator (LO) pulses which have an average number of photons per impulse much greater than 1, that is, on average $\mu LO \gg 1$. This means that the peak power of the pulse generated by the local oscillator laser is for example of about 1-10 mW. This local oscillator laser emits pulses which have substantially the same duration T of the weak pulses which are received by the receiver. At the input of the optical coupler, the LO pulse is preferably adapted to have the same polarization state of the corresponding weak pulse entering in the optical coupler simultaneously. Furthermore, the LO pulses have a wavelength $\lambda_{LO}$.

The difference between the wavelength of the local oscillator pulse $\lambda_{LO}$ and the wavelength of the weak pulse $\lambda_{wp}$ is such that:

$$\frac{1}{T} < \left| \frac{c}{\lambda_{wp}} - \frac{c}{\lambda_{LO}} \right| \leq 100 \text{ GHz}$$

According to an embodiment of the invention, the difference between the wavelength of the local oscillator pulse $\lambda_{LO}$ and the wavelength of the weak pulse $\lambda_{wp}$ is preferably such that:

$$\frac{1}{T} < \left| \frac{c}{\lambda_{wp}} - \frac{c}{\lambda_{LO}} \right| \leq 10 \text{ GHz}$$

This means that the carrier frequency of the interference signal, detailed below, $$f = \left| \frac{c}{\lambda_{wp}} - \frac{c}{\lambda_{LO}} \right|$$

is of few Gigahertz, while the frequency of the two signals, that is the frequency of the weak pulse $$f_{wp} = \frac{c}{\lambda_{wp}}$$

and the frequency of the local oscillator signal $$f_{LO} = \frac{c}{\lambda_{LO}},$$

is preferably of the order of hundreds of Terahertz. For example, for a wavelength of 1550 nm, $f_{wp}$ is circa 190 THz, for a wavelength of 800 nm, $f_{wp}$ is circa 380 THz. This means that:

$$f = \left| \frac{c}{\lambda_{wp}} - \frac{c}{\lambda_{LO}} \right| \ll \frac{c}{\lambda_{wp}},$$

-continued $$f = \left| \frac{c}{\lambda_{wp}} - \frac{c}{\lambda_{LO}} \right| \ll \frac{c}{\lambda_{LO}}.$$

The difference between the wavelength $\lambda_{LO}$ and the wavelength $\lambda_{wp}$ is kept constant in time, that is, once a value of the difference within the claimed interval is selected, the selected value is kept fixed in time.

In order to keep the difference between the two wavelengths fixed in time, several solutions are possible.

For example, a laser source emitting the signal which is transformed in the weak pulses and the local oscillator laser source may require an additional device for locking the laser emissions, in a way that their difference in wavelength is fixed to a constant value. For this purpose, in a first embodiment a portion of the signal from both laser sources (the laser emitting the weak pulses and the local oscillator laser) can be taken, in order to analyse the interference signal between the signals emitted by the two lasers and to lock their beat frequency to a constant value. Alternatively, in a different embodiment, the two laser sources employed for weak pulses and local oscillator pulses, could be both locked to a frequency comb laser. Then, the emission of the first laser (generating the weak pulses) could be locked to a fixed mode of the frequency comb. The emission of the second laser (local oscillator laser) could be locked to another fixed mode of the frequency comb.

The invention also encompasses the possibility that the two wavelengths of the two inputs to the optical coupler are identical, that is $\lambda_{wp} = \lambda_{LO}$. This special case may be obtained for example when the weak pulses and the local oscillator pulses belong to the same laser source, i.e., both inputs to the optical coupler are prepared by splitting the emission from a single laser source. In this case, we assume the stability of the relative phase between the weak pulse and the local oscillator signal during their propagation from transmitter to receiver. In this case, the receiver preferably has to modulate the phase of one of the two inputs. This modulation may be made by employing a phase variator. In this special case, the frequency of the phase modulation introduced by the phase variator is then related to the carrier frequency of the interference signal analysed by the receiver. The carrier frequency of the interference signal depends on the characteristics of the phase-variator itself. The modulation may take place for example using a piezoelectric device that varies the optical path of one of the first or second input of the optical coupler. Alternatively, a phase shifter or a phase modulator may be used. Therefore, the phase difference between the weak pulse and the local oscillator pulse is not constant any more during the interference in the optical coupler. In this special case thus the carrier frequency is the modulation frequency which has been imposed by the phase variator. In the following thus what is applicable for the "carrier frequency" applies as well for the modulation frequency.

Preferably, the signal emitted by the local oscillator laser source has the same polarization as the polarization of the weak pulse received by the receiver.

Preferably, the spatial mode distribution of the weak pulse and of the local oscillator signal is substantially the same. The weak pulse and the local oscillator pulse are the inputs at the first and second input of the optical coupler. The weak pulse and the local oscillator pulse enter the first and second input of the optical coupler at the same time, for example thanks to a suitable synchronizer. A suitable synchronizer may mean that a properly adapted delay line is used.

"Entering the optical coupler at the same time" means that the quantum signal (the weak pulse) and the local oscillator signal are synchronized together when reaching the optical coupler.

Furthermore, preferably, the carrier frequency has to satisfy $$f > \frac{1}{T}$$

meaning that the carrier frequency preferably has values slightly superior than $1/T$, with an upper limit of around 100 GHz, preferably around 10 GHz.

Furthermore, preferably, the modulation frequency has to satisfy $$f > \frac{1}{T}$$

meaning that the modulation frequency preferably has values slightly superior than $1/T$, with an upper limit of around 100 GHz, preferably around 10 GHZ. As said the modulation frequency as applied by the phase variator "follows" the same behavior of the carrier frequency.

Interference then takes place in the optical coupler between the weak pulse and the local oscillator signal.

The interference signal that results from the interference as described above is outputted by the first and second output of the optical coupler and this signal is detected by a first and a second photodetector, part of the receiver of the invention. In the first and/or in the second photodetector, photons excite electrons from the valence band to the conductive band and a photocurrent is generated. Therefore, as a result of the detected interference signal by the first and second photodetector, a first and a second photocurrent are generated by the first and second photodetector. Preferably, the two photodetectors are very similar to each other, more preferably they are identical.

An electric circuit is preferably provided to subtract the first and second photocurrent, creating a difference signal. The result of the difference between the two photocurrents is a pulse of duration T (the same duration T of the local oscillator signal and of the weak pulse) showing a modulation due to the interference. The process described is known in literature as homodyne or heterodyne detection. Heterodyne detection takes place when the wavelengths of the local oscillator signal and the weak pulses are different, homodyne detection takes place otherwise.

According to quantum optics theory (R. Loudon, "The Quantum Theory of Light", 3. Ed. Oxford University Press, 2000, M. G. A. Paris, J. Řeháček, "Quantum State Estimation", Springer, 2004) the difference signal has the following equation:

$$S(t) \propto \sqrt{\mu_{wp}} A(t, T)\cos(2\pi f t) + N(t)$$

Where $S(t)$ is the difference signal as a function of time t, $N(t)$ is a function of the noise, f is the carrier frequency (or modulation frequency), and $A(t, T)$ represents the envelope of the signal with a duration equal to T. $\sqrt{\alpha_{wp}} A(t, T) \cos(2\pi ft)$ depends only on the interference between the weak pulse and the local oscillator signal, it does not depends on the noise. $\mu_{wp}$ is the mean photon number of the weak pulse. A(t, T) may be for example a Gaussian profile. N(t) is substantially the noise. The equation above is valid in both cases where the wavelength of the local oscillator pulse $\lambda_{LO}$ and the wavelength of the weak pulse $\lambda_{wp}$ are different (and in this case in the equation above f is the carrier frequency) and where the wavelength of the local oscillator pulse $\lambda_{LO}$ and the wavelength of the weak pulse $\lambda_{wp}$ are the same (and in this case in the equation above f is the modulation frequency).

The subtraction of the two photocurrents provides the difference signal. The DC terms are eliminated completely during the subtraction process, due to the fact that the two arms of the optical coupler are balanced in such a way that each arm receives equal weak pulse signal and local oscillator signal powers.

This difference signal contains not only the result of the interference between the weak pulse and the local oscillator signal, but also noise.

The difference signal is then preferably amplified. The amplification may take place thanks to a transimpedance amplifier. The resulting amplified difference signal is filtered. Alternatively, the previous amplification stage can be embodied in the frequency filter, for example by means of a resonant amplifier. In any case, the filter is such that only a portion of the difference signal centred around the carrier frequency $$f = \left| \frac{c}{\lambda_{wp}} - \frac{c}{\lambda_{LO}} \right|$$

is considered. In other words, a portion of the difference signal in the frequency range f±Δf is taken. Thus the portion of the difference signal considered spans from f−Δf to f+Δf and the rest of the difference signals having frequencies outside this range is disregarded.

In the special case where the two wavelengths are exactly the same (e. g., the same laser source is used to generate the weak pulse and the local oscillator signal), before interference takes place, the phase of either the weak pulse or the local oscillator is changed. Furthermore, still in this specific embodiment, the carrier frequency f is the phase modulation frequency introduced by the phase variator that must be included in the system. Therefore, when the difference signal is filtered, the filter is such that only a portion of the difference signal centred around the modulation frequency f introduced by the phase variator is considered. In other words, a portion of the difference signal in the frequency range f+Δf is taken. Thus the portion of the difference signal considered spans from f−Δf to f+Δf and the rest of the difference signals having frequencies outside this range is disregarded.

The filter may be for example a radiofrequency filter. It is preferably a pass band filter. The band of the difference signal which is allowed to pass through the filter is centred on the carrier frequency (or the modulation frequency) and it is preferably comprised between 0.1 kHz and 100 Gigahertz, more preferably between 0.1 kHz and 10 Gigahertz, even more preferably 0.1 kHz and 1 GHz. Selecting a pass band filter having a bandwidth which defines a narrow range around the carrier frequency allows to cut off the noise signal, for example the shot noise. The resulting filtered difference signal is compared with a threshold. The amplitude or intensity of the resulting filtered signal is preferably compared with a predefined threshold.

Thus for example the amplitude or intensity of the filtered signal is obtained and this obtained amplitude or intensity is compared with the selected threshold.

The comparison can be performed by means of a discriminator. Thus, if a parameter of the filtered signal (for example, amplitude or intensity) is above the threshold, then it is considered that indeed what has been detected is a weak pulse. Otherwise, if the parameter of the signal is below the threshold, then it is considered that what has been detected is just noise, i.e. the received signal is only due to noise, such as shot noise.

The receiver of the invention is therefore capable of functioning as a single-photon receiver, discriminating whether the incoming signal is a weak pulse or noise signal. The receiver uses "standard" components which are relatively inexpensive. Furthermore, the size of the overall receiver is relatively small. The receiver can work at room temperature and no special cooling devices are required.

In the special case of $\lambda_{wp} = \lambda_{LO}$, preferably, the phase variator is adapted to vary the phase of the local oscillator signal. The phase of one of the two signals is changed before reaching the optical coupler. Due to the fact that the weak pulse is indeed a "weak state", it is preferred to change the phase of the local oscillator signal so that, in case of additional losses generated by the phase variator, the weak pulse is not destroyed.

Preferably, the receiver comprises an amplifier positioned at the output of the electronic circuit adapted to amplify the difference signal. The amplification allows an easier processing of the amplified signal. Alternatively, the amplifier can be resonant to the carrier frequency (or the modulation frequency), thus it can be embodied in the subsequent frequency filter.

Preferably, the first or the second photodetector is a P-I-N photodetector. More preferably, the first and the second photodetector are P-I-N photodetectors. Preferably, the first and second photodetectors are identical to each other. Identical photodetectors allows a better quality of the measurement.

Preferably, the duration T is comprised between 100 picoseconds and 10 nanoseconds. The shorter the T duration the fastest the detector could work. At the same time, the optimal duration T does depend on the carrier frequency (or modulation frequency) defined by the receiver setup, since it is preferable to satisfy the relation f>1/T.

Preferably, the wavelength of the weak pulse $\lambda_{wp}$ is in the near-infrared spectrum or telecom band. With telecom band, a wavelength comprised the range from 800 nm to 1625 nm is meant. Fiber-optic communication is mainly conducted in the wavelength region where optical fibers have small transmission loss. This low-loss wavelength region ranges from 1260 nm to 1625 nm, and is divided into five wavelength bands referred to as the O-, E-, S-, C- and L-bands, Furthermore, communication in the free atmosphere is also considered and therefore the lower range of the wavelength may be used as well. Preferably, a wavelength among the standard telecommunication wavelengths is chosen.

Preferably, the frequency range for the carrier frequency or modulation frequency is comprised between 0.1 kHz and 100 GHz, more preferably between 0.1 kHz and 10 GHz. For QKD applications, a typical frequency range is between 1 GHz and 100 GHz, preferably between 1 GHz and 10 GHz. The upper limit depends on current technological limitations. For instance, photodetectors and electronic devices have in general a limited bandwidth. The carrier frequency cannot be too small otherwise the condition f>1/T is not valid anymore. It cannot be too big otherwise the photodetector and the subsequent electronics are not able to properly respond to it.

Preferably, the discriminator threshold is a function of the dark count probability of the receiver. The threshold is set so that, when there is no weak pulse, the receiver detects "fake" signals (due to the shot noise) with a given probability. The selected probability (the dark count of the receiver) is therefore imposing the value of the threshold.

The invention will be now better understood with reference to the appended drawings where:

FIG. 2a is another embodiment of the system of FIG. 2;

Figure 1:
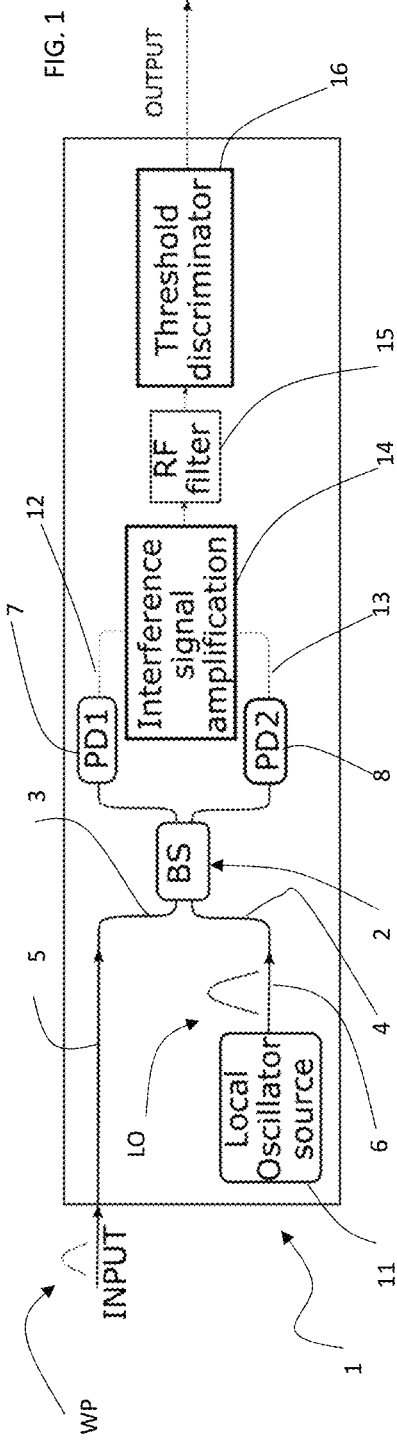
FIG. 1 is a schematic view of a receiver according to the present invention.
Figures 7, 8:
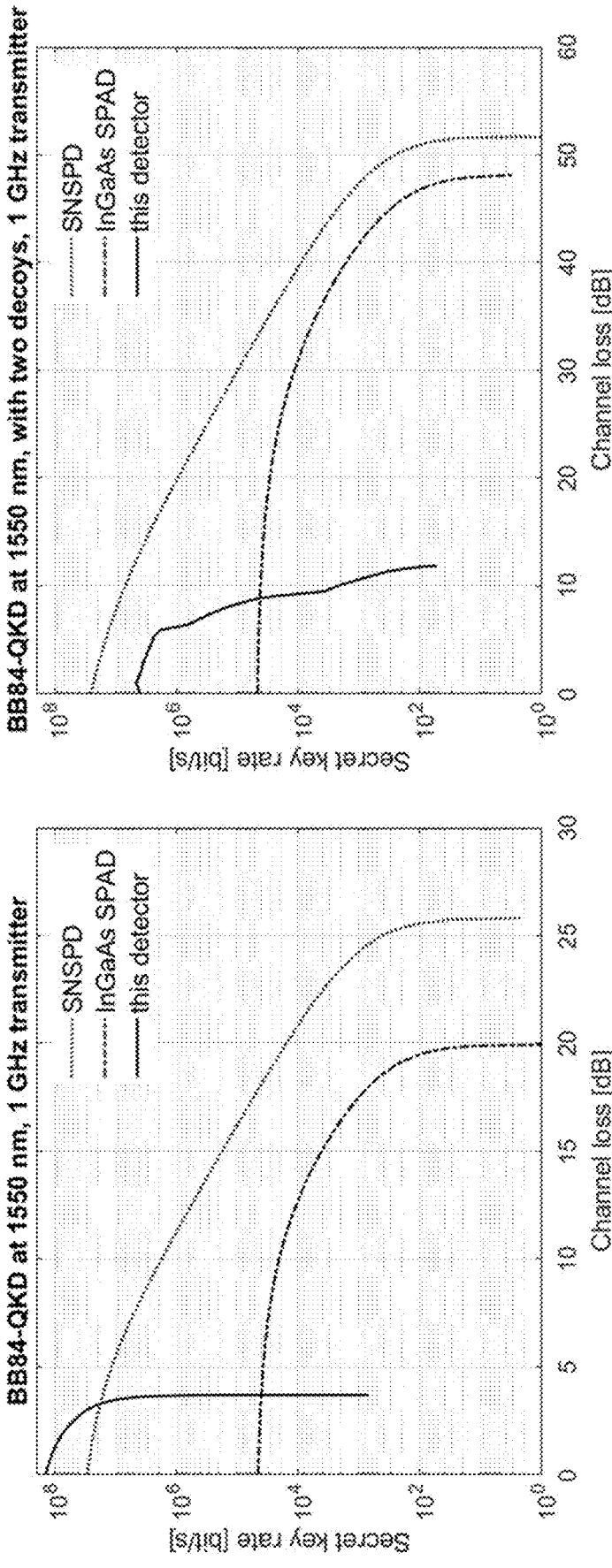
FIG. 7 represents three graphs relative to three different simulations of three different systems: for receiving weak pulses in a quantum key distribution system: a first system including the receiver of the invention and two systems including two different receivers according to the prior art using a protocol without decoy states.
Figures 9, 10, 11:
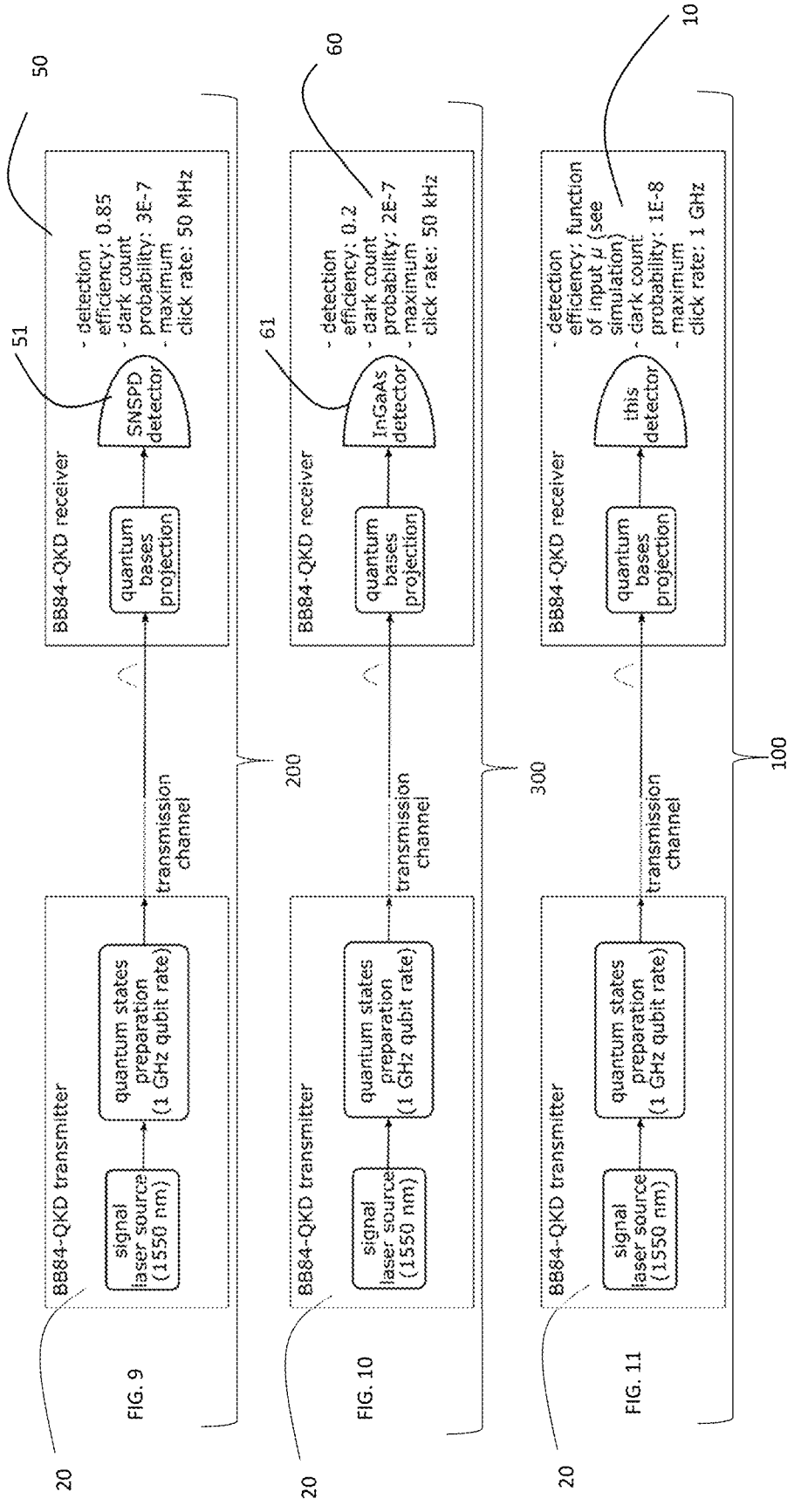

FIG. 8 represents three graphs relative to three different simulations of three different systems for receiving weak pulses in a quantum key distribution system: a first system including the receiver of the invention of FIG. 1 and two systems including two different receivers according to the prior art using a protocol with two decoy states; FIGS. 9-11 represent the layout of the three systems used in the simulations of FIGS. 7 and 8.

With initial reference to FIG. 1, with 1 a receiver of weak pulses in a QKD system is globally indicated. The receiver 1 includes a 50% optical coupler 2 having a first and a second arm 3,4 defining a first and a second inputs 5, 6 and a first and a second output 7, 8.

Figure 2:
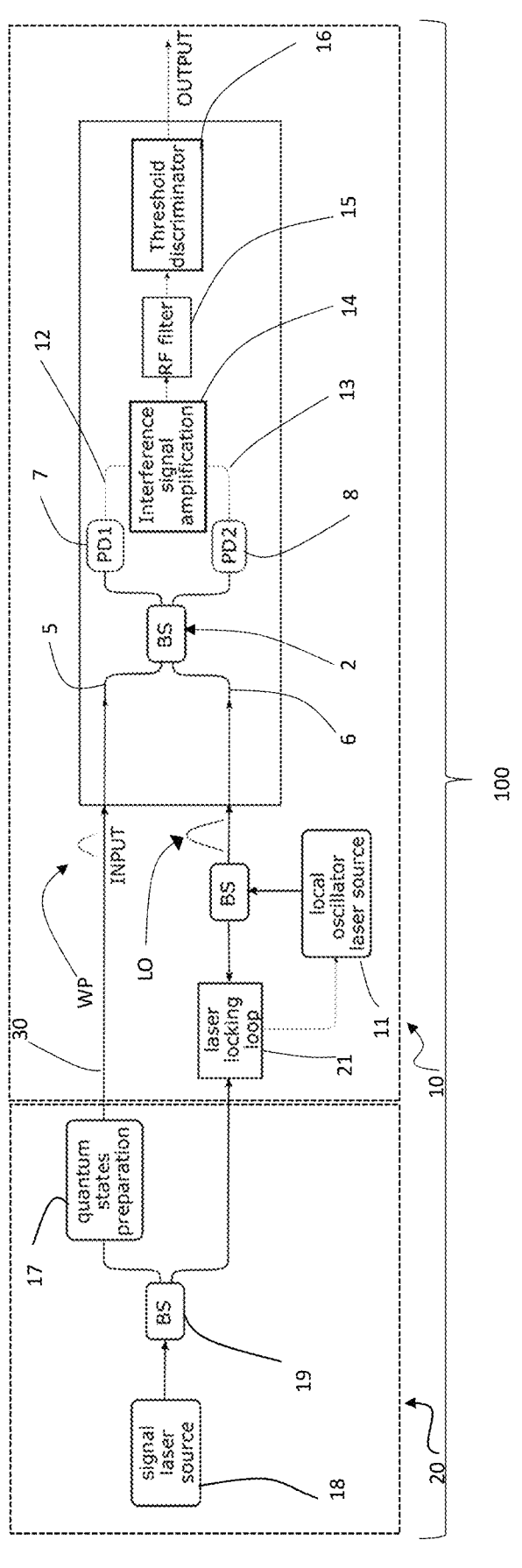
FIG. 2 is a schematic view of a system for transmitting and receiving weak pulses in a quantum key distribution system comprising the receiver of the invention of FIG. 1.
Figure 2A:
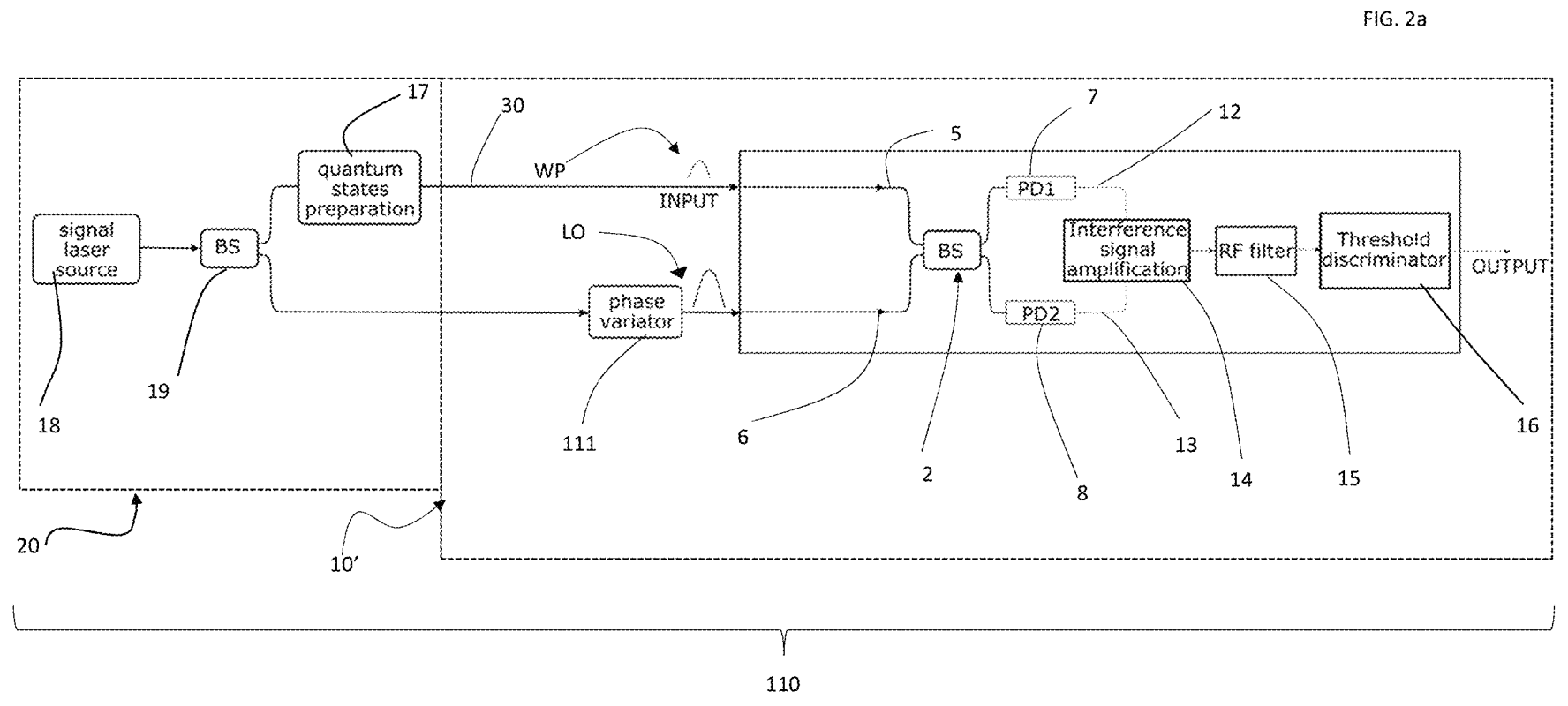

The first input 5 of the first arm 3 receives from a quantum channel 30 a weak pulse WP (as shown in FIGS. 2 and 2a) having duration T, wavelength $\lambda_{wp}$, $\mu_{wp}$ and a given polarization. This weak pulse may be generated by any transmitter (shown for example in FIGS. 2 and 2a) capable of generating weak pulses in a quantum key distribution system with discrete-variable encoding.

Further, the receiver 1 includes a laser source 11 adapted to generate a local oscillator pulse LO having duration T, in the same polarization state as the weak pulse, and having a wavelength $\lambda_{LO}$. The second input 6 of the second arm 4 receives the local oscillator pulse LO.

The relationship among their wavelengths $\lambda_{LO}$ and $\lambda_{wp}$ is such that $$\frac{1}{T} < \left| \frac{c}{\lambda_{wp}} - \frac{c}{\lambda_{LO}} \right| \leq 10 \text{ GHz}$$

Alternatively, $\lambda_{wp}$=$\lambda_{LO}$.

The local oscillator pulse LO and the weak pulse can generate an interference signal, having the same duration T, having the same polarization state of the local oscillator pulse and of the weak pulse.

FIG. 2 shows a possible embodiment of the general receiver 1, called receiver 10, in a system of transmission 100 of weak pulses in a quantum key distribution system with discrete-variable encoding. The system 100 includes a transmitter 20 for generating the weak pulses. The transmitter 20 includes a laser source 18, preferably a phase-randomized pulsed laser source. The train of pulses emitted by the laser source 18 are divided in two, by for example a beam splitter 19. Part of the train of pulses is thus further processed to generate the weak pulses WP, by for example a suitable quantum state preparation 17.

The weak pulses WP generated by the transmitter 20 are sent via a suitable quantum channel 30.

The system 100 includes the receiver of the invention 10. The same elements present in the receiver 1 are indicated in the receiver 10 with the same reference numerals. As in receiver 1, the weak pulses WP from the quantum channel 30 enter as inputs to the first arm 5 of the beam splitter. The signal from the laser source 18 split by the beam splitter 19 forms a locked loop 21 with the local oscillator signals produced by the laser source 11. In this way the difference in wavelength $|\lambda_{wp}-\lambda_{LO}|$ between the wavelength of pulses emitted by the laser 18 (and thus of the weak pulse) and the wavelength of the pulses emitted by the laser 11 remains constant.

LO and weak pulse WP interfere in the optical coupler 2 and the interference signal is detected by a first and second photodetector 12 and 13. The first and second photodetector 12, 13 output each a photocurrent which is subtracted in a circuit 14 where the difference of the two photocurrent is made and amplified.

FIG. 2a shows a different embodiment of the general receiver 1, called receiver 10', in a system of transmission 110 of weak pulses in a quantum key distribution system with discrete-variable encoding. The system 110 includes the same transmitter 20 for generating the weak pulses as described with reference to FIG. 2.

The weak pulses WP generated by the transmitter 20 are sent via a suitable quantum channel 30.

The system 100 includes the receiver of the invention 10. The same elements present in the receiver 10 are indicated in the receiver 10' with the same reference numerals. As in receiver 10, the weak pulses WP from the quantum channel 30 enter as inputs to the first arm 5 of the beam splitter. The signal from the laser source 18 split by the beam splitter 19 goes through a phase variator 111. In this way, although the wavelengths of LO and WP are in this case identical, a modulation frequency is imposed by the phase variator 111.

LO and weak pulse WP interfere in the optical coupler 2 and the interference signal is detected by a first and second photodetector 12 and 13. The first and second photodetector 12, 13 output each a photocurrent which is subtracted in a circuit 14 where the difference of the two photocurrent is made and amplified.

Figure 3:
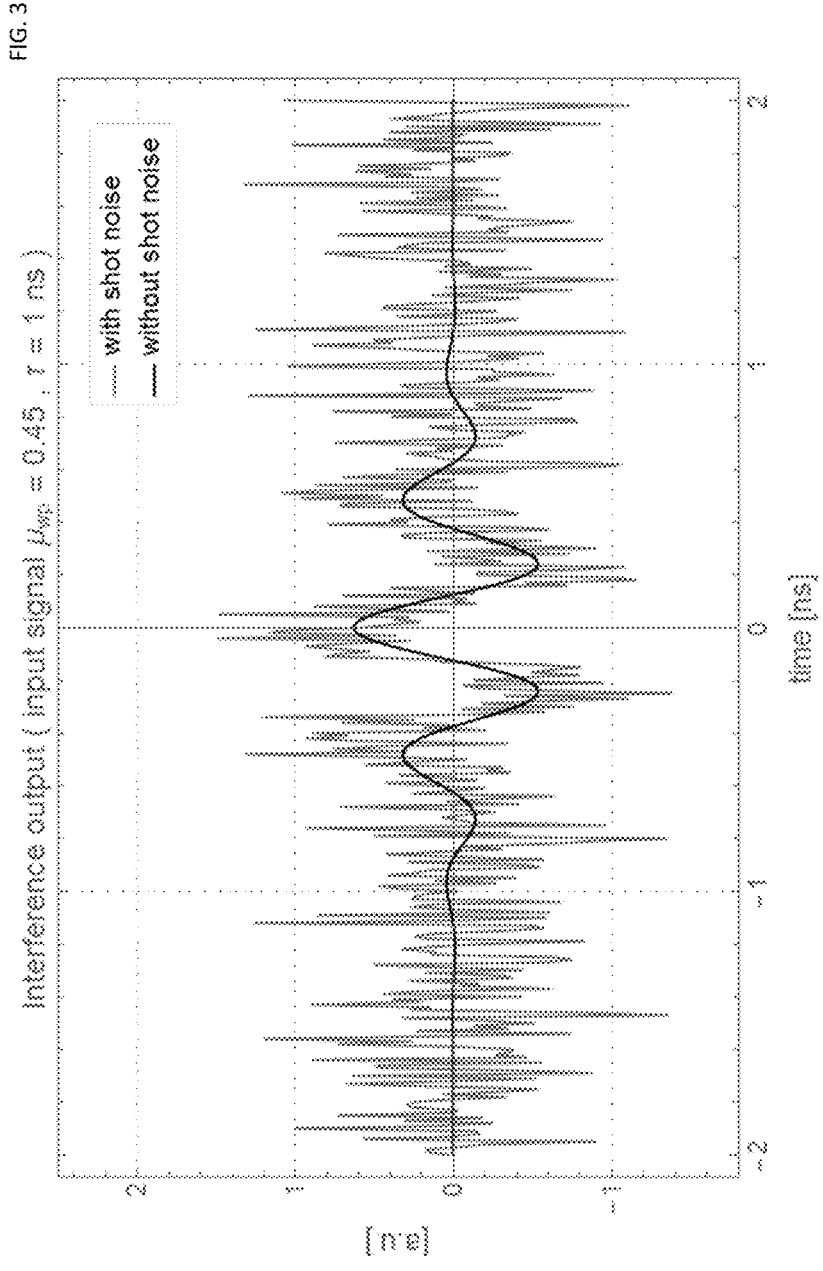
FIG. 3 are two graphs of the difference signal over time when a weak pulse having $\mu_{wp}$=0.45 and T≈1 ns is received by the receiver of the invention of FIG. 1 or 2, in the ideal case without shot noise (thick curve) and with shot noise (thin curve)

The resulting difference signal, either from system 100 or 110, is depicted in FIG. 3. FIG. 3 shows the detection of an interference between weak pulse WP and a local oscillator signal LO. The weak pulse has the following data:

$\mu_{wp} = 0.45$ a Gaussian shape with a FWHM equal to 1 ns.

The local oscillator signal LO has a Gaussian shape with a FWHM equal to 1 ns.

Furthermore, the carrier frequency f is $$f = \left| \frac{c}{\lambda_{cs}} - \frac{c}{\lambda_{LO}} \right| = \frac{2}{1\ \text{ns}} = 2\ \text{GHz}$$

The thick black curve represents the difference signal in ideal condition, that is, the difference signal in case only the weak pulse is detected and interfered with the local oscillator signal. The thin grey curve represents the difference signal when, in addition to the weak pulse signal, also the shot noise is present.

Figure 4:
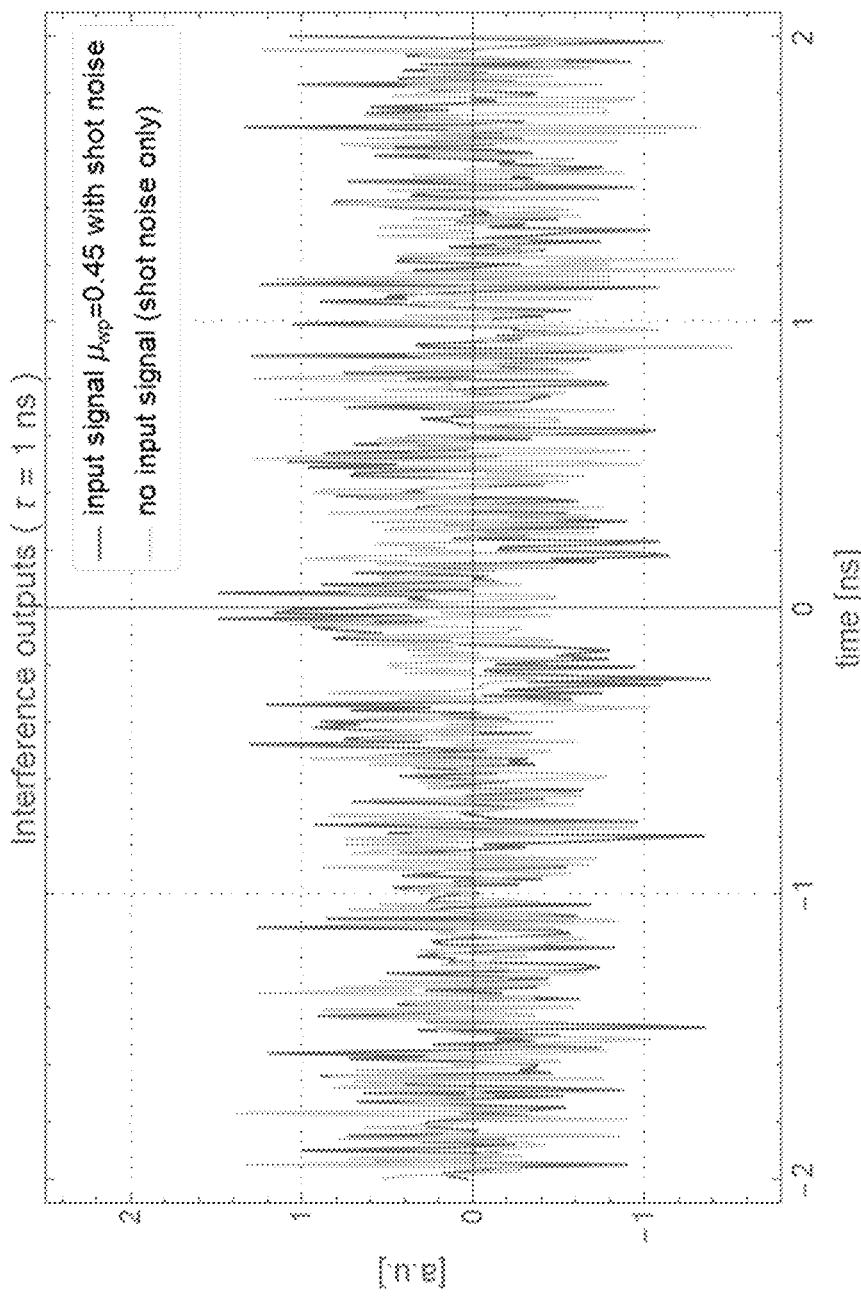
FIG. 4 are two graphs of the difference signal over time when a weak pulse having $\mu_{wp}$=0.45 and T≈1 ns is received by the receiver of the invention of FIG. 1 or 2, with shot noise (same curve as in FIG. 3, now as a thick curve) and when only shot noise is received (thin curve)

FIG. 4 shows a comparison between the difference signal obtained when receiving the same weak pulse signal as above with shot noise (darker line) and a signal which is only shot noise (lighter line).

Figure 5:
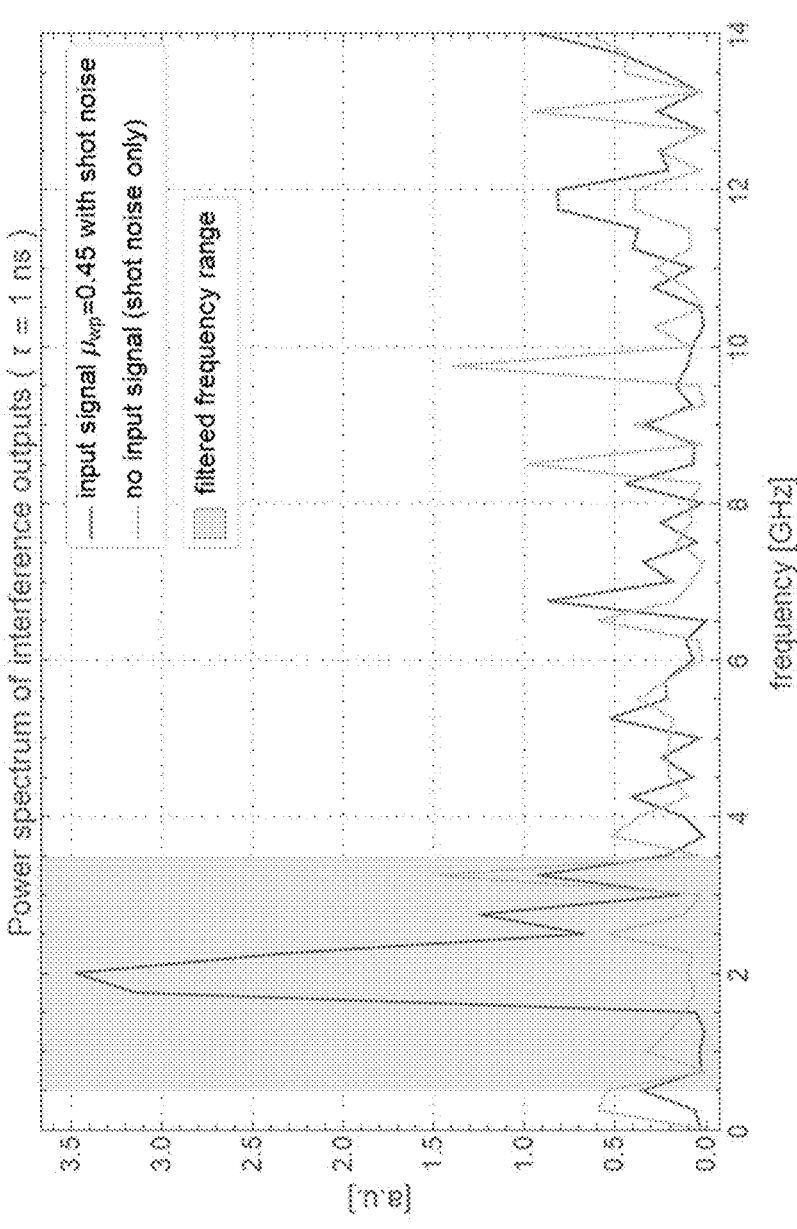
FIG. 5 is the power spectrum of the two signals of FIG. 4.

The receiver 1, 10 or 10' further comprises a filter 15 adapted to filter the difference signal. The filter has a bandwidth which is preferably centred around the carrier frequency (or modulation frequency) f of the difference signal of interest. The power spectrum of the difference signal is for example depicted in FIG. 5. FIG. 5 shows the power spectrum of the difference signals of FIG. 4. The shadowed area represents the bandwidth of the filter 15, so that only that portion of the difference signal is considered. In other words, calling S(t) the difference signal, S(t) has a given spectrum S(t)=S(f1)+S(f2)+S(f3)+ . . . . Of this spectrum, only a portion is taken, by the filter 15. This portion includes only the spectral components f_n having a frequency which belongs to the bandwidth of the filter.

The receiver 1, 10 and 10' of FIGS. 1, 2 and 2a further includes a discriminator 16, where a comparison between the filtered signal outputted by filter 15 and a threshold is made. The filtered signal is integrated over the whole bandwidth of the filter 15. The resulting value of the integrated signal is compared with a threshold. Therefore, the filtered signal is considered as representing a weak pulse if the value of the integrated filtered difference signal is above the threshold.

The response of the receiver 10 was analyzed using a Monte Carlo simulation, in which the presence of shot noise was considered by adding, to the expected interference profile, a random profile having a mean equal to zero, given from the Gaussian distribution that characterizes the shot noise on the measurement of the electric field of a laser source. The results of this Monte Carlo simulation described below are given in FIG. 6, where the detection efficiency and the dark count curves as a function of $\mu_{wp}$ (the mean photon number of the weak pulses WP) are depicted.

The expected interference profile used for the simulation is equal to:

$$S^{simulation}(t) = \sqrt{\mu_{wp}}\ \frac{2\sqrt{2\ln 2}\ e^{-4\ln 2 t^2/\tau^2}}{\tau\sqrt{2\pi}} \cos(2\pi f t) + SN(t)$$

Where t is time and f is the carrier frequency.
$\mu_{wp}$ is the mean photon number of the weak pulses.

$$\frac{2\sqrt{2\ln 2}\ e^{-4\ln 2 t^2/\tau^2}}{\tau\sqrt{2\pi}}$$

is a temporal envelope with a Gaussian shape, centered in t=0 and having a FWHM $\tau$. This Gaussian envelope is produced by the interference of LO signal and weak pulse signal, both pulses having a Gaussian shape, both centered in t=0 and having a FWHM T.

The duration of the weak pulse=duration of LO is given by the FWHM of Gaussian envelope, which is named $\tau$.

The first addend of this equation does not depend on the shot noise. This is substantially identical to the thick curve of FIG. 3.

SN(t) is the shot noise. The variance of SN(t) is 0.25, according to the shot-noise variance of the homodyne signal normalized to the shot-noise of the local oscillator (see Loudon "The Quantum Theory of Light", Oxford Science Publications).

In the simulation, the following parameters have been selected:

The Gaussian shape exhibited by both LO and weak pulse, and thus by their interference envelope, has a $\tau$ (FWHM) equal to 1 ns;

In order to analyse the power spectrum of the interference signals, a time window with 4 ns of duration is observed, centred around t=0 (from −2 ns to 2 ns).

S(t) is given in arbitrary units (a.u. in FIG. 3) because there is a multiplicative constant factor of no interest being the same also for the shot noise;

$$\text{carrier frequency } f = 2/\tau = 2\ \text{GHz};$$

$$\text{filter bandwidth } \Delta f = 3/\tau = 3\ \text{GHz};$$

the following values of $\mu_{wp}$ have been selected: 0.011, 0.057, 0.11, 0.23, 0.34, 0.45, 0.57, 0.85, 1.1.

The shot noise has been considered as a random variable centred around zero and having a variance equal to 0.25. At each time instant t, a value from this random distribution is taken and this is considered as SN(t).

The lowest measurable dark count probability in this simulation is 10-8.

In particular, for each fixed value for the average number of photons of the weak pulse to the receiver 1 ($\mu_{wp}$ ranging between 0.011 and 11) 107 different profiles $S^{simulation}(t)$ were generated resulting from the sum of the interference profile and the random noise due to shot noise. Each single profile contains 401 samples, where the independent variable t takes 401 values from −2$\tau$ to +2$\tau$. A Gaussian envelope, centered around t=0, was chosen for the interference profile, with a full width at half height $\tau$, as it has been chosen for the temporal profile of both LO and weak pulse. The carrier frequency of the interference signal is f=2/$\tau$.

Finally, a further 108 random profiles were generated containing only the shot noise SN(t), i.e., only the second addend of $S^{simulation}$(t), in order to simulate the circumstance in which no signal arrives at the detector input. Then, the corresponding power spectrum was obtained from each time profile. In the simulation, the observation window for the spectrum calculation is $4*\tau$, from $-2\tau$ to $+2\tau$. The power spectrum is then filtered around the peak of the carrier and the resulting signal is integrated around the filter frequencies (about $3/\tau$ wide). If the value of the integral is higher than a certain threshold, the device communicates the receipt of the quantum signal. Otherwise, the event does not constitute a revelation. Once the threshold is set, the probability with which an incident signal $S^{simulation}$(t) generates a revelation constitutes the detection probability of the device (also referred as detection efficiency), while the probability with which the absence of an incident signal (i.e., only SN(t) present) generates a revelation determines the dark count probability of the device.

From the simulation, it emerged that the optimal threshold that maximizes the signal/noise ratio (the ratio between efficiency and dark count probability) is constant for the entire interval of $\mu_{wp}$ equal to [0.057, 1.1]. Consequently, the estimated dark count probability is constant throughout this interval and equal to the minimum dark count quantifiable by the simulation (which is equal to $1*10\text{-}8$). For the remaining point with $\mu_{wp}$=0.011, the optimal threshold drops and the dark count probability rises to $3*10\text{-}8$. In this case, the corresponding estimated efficiency is $4*10\text{-}7$ and the signal-to-noise ratio is about 13. This ratio of efficiency to dark counts corresponds to a contribution to the quantum bit error rate of about 44%, which is too much high to make quantum communication possible. Therefore, according to this simulation, the receiver 1 of the invention can be used to detect weak pulses having a number of photons down to about $\mu_{wp}$≈0.057, at which point the contribution to the quantum bit error rate caused by the dark counts is less than 1%.

FIGS. 7 and 8 show the simulation of a standard quantum key distribution protocol (BB84-QKD), for which the bit generation rate (secret key rate), as the transmission channel losses vary, has been calculated for three different receivers. In the standard BB84-QKD protocol, the transmitter and the receiver, respectively, prepares and measures the qubits by selecting at random between two bases of quantum states. In this simulation, as in the original BB84 protocol, the basis choice probability is set to 50% at both the transmitter and the receiver.

Here, the simulation is relative to three different systems for transmitting and receiving weak pulses in the QKD system, each including a receiver and a transmitter 20. The transmitter 20 is the same for all the three systems. The system of FIG. 11 is the system 100 including the receiver of the present invention. FIG. 11 shows the system 100 including receiver 10 already described in FIG. 2. The system 200 in FIG. 9 is according to the prior art and uses a receiver 50 comprising a SNSPD photodetector 51. The system 300 in FIG. 10 is according to the prior art and uses a receiver 60 comprising a SPAD photodetector 51, based on InGaAs semiconductor.

The data of the three detectors are as follows:

InGaAs SPAD
  Detection efficiency: 0.2
  Dark count probability: $2*10\text{-}7$
  Maximum click rate: 50 KHz SNSPD
  Detection efficiency: 0.85
  Dark count probability: $3*10\text{-}7$
  Maximum click rate: 50 MHz
Receiver of the Invention
  Detection efficiency: it depends on $\mu_{sc}$
  Dark count probability: $10\text{-}8$
  Maximum click rate: 1 GHz The transmitter 20, the same in all three cases, prepares $10^9$ quantum states (weak pulses) per second, suitably attenuating and modulating a 1550 nm laser source. The different bit rate resulting in the three receivers 10, 50 and 60 is due to the different characteristics of detection efficiency and dark counts, as well as to the maximum count rate and any after pulsing signals.

Figure 6:
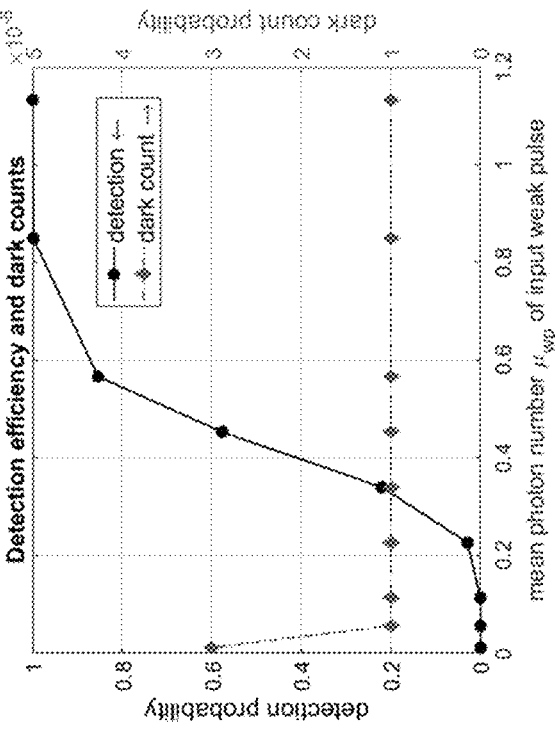
FIG. 6 is a graph representing a Monte Carlo simulation result of the detector properties (detection probability and dark count probability) vs. the mean photon number of the received weak pulse.

In the detector receiver of the invention, the efficiency depends on the average number of photons per pulse $\mu_{wp}$ that affects the receiver, according to the relationship shown in FIG. 6. Note that, due to the losses of the transmission channel, the weak pulses incident on the receiver has a lower average number of photons than the same pulse as prepared by the transmitter 20.

In FIG. 7, the average number of photons per pulse is a value set by the transmitter, and this value has been optimized for each channel loss value and for each receiver 10, 50, 60, in order to maximize the secret key rate obtainable for the given situation. In general, in fact, in a quantum communication protocol, the optimal value of the average number of photons per pulse is the result of a trade-off between the ability to measure the pulse at the receiver with a low bit error rate, and the requirement of limiting the number of pulses having more than one photon. For the latter, communication security is not guaranteed. In FIG. 7, the protocol used does not include decoy states. In FIG. 8, the same simulation as in FIG. 7 is performed, but in this case the quantum communication protocol includes two decoy states, which allow longer transmission distances to be reached. In this protocol, the transmitter 20 prepares each pulse by randomly choosing a different average number of photons, among three different discrete values. For all three detectors, one of these three values was taken equal to zero (vacuum and weak decoy states []). For all three detectors, the probability of choosing the largest $\mu$ value was set to 65%, the probability of choosing the weak decoy was set to 30%, and, consequently, the probability of choosing the vacuum decoy was set to 5%, in agreement with reference https://journals.aps.org/pra/abstract/10.1103/Phys-RevA.72.012326.

Only for the detector related to the present invention, the mean photon number of the largest u and of the weak decoy, prepared at the transmitter, for each channel loss, were selected in order to maximize the secret key rate, with the constrain that the mean photon number arriving at the receiver satisfying the relation $\mu_{wp}$>0.057. In this way, the detector applies a fixed threshold, in agreement with the above simulation.

For the other two detectors, the value of the weak decoy prepared at the transmitter was fixed to 0.01, while the value of the largest u was optimized in order to maximize the secret key rate at each channel loss.

In order to calculate the secret key rate (SKR), the following references have been used:
  https://journals.aps.org/rmp/abstract/10.1103/RevMod-
    Phys.81.1301
  detailing how to calculate the SKR without decoy state
    (FIG. 7); and
  https://journals.aps.org/pra/abstract/10.1103/Phys-
    RevA.72.012326

19 detailing how to calculate the SKR with two decoy states, vacuum and weak decoy (FIG. 8).

The secret key rate in QKD is simply the bit rate at which the secure key is distributed from the transmitter to the receiver. The secure key is extracted starting from a certain rate of the transmitter, which is the rate at which the transmitter prepares the qubits (in the simulation, this rate is fixed at 1 GHz). The formulas for extracting this SKR starting from the rate of the transmitter depend, among other things, also on the type of detector of the receiver, and are fully explained in the two references.

The invention claimed is:

1. A receiver for receiving weak pulses of light in a quantum key distribution system with discrete-variable encoding, the receiver comprising:

an optical coupler having a first and a second input and a first and second output, the optical coupler being adapted to be connected to a quantum channel to receive the weak pulses at the first input, each weak pulse having duration T and wavelength $\lambda_{wp}$, and local oscillator signals at the second input;

a local oscillator laser adapted to generate the local oscillator signals, each local oscillator signal being an impulse of duration T and wavelength $\lambda_{LO}$, wherein the difference between $\lambda_{LO}$ and $\lambda_{wp}$ is such that:

$$\frac{1}{T} < \left| \frac{c}{\lambda_{wp}} - \frac{c}{\lambda_{LO}} \right| \le 100 \text{ GHz}$$

a laser locking system for locking the difference between the $\lambda_{LO}$ and $\lambda_{wp}$ wavelengths to a fixed value, so that the difference remains constant in time;

a synchronizer connected to the local oscillator laser so that the local oscillator laser emits a local oscillator signal at a given time for which the weak pulse and the local oscillator signal reach the first and second input, respectively, at the same time;

a first and a second photodetector, the first and second photodetector being connected to the first and second output, respectively, of the optical coupler and emitting a first and a second electric signal, the first and second electric signal being function of the interference between the weak pulse and the local oscillator signal in the optical coupler;

an electronic circuit configured to obtain a difference signal, the difference signal being function of the difference between the first electric signal emitted by the first photodetector and the second electric signal emitted by the second photodetector;

a filter adapted to filter the difference signal, generating a filtered signal which includes a portion of the difference signal having a frequency in a frequency range around a carrier frequency f, where $$f = \left| \frac{c}{\lambda_{wp}} - \frac{c}{\lambda_{LO}} \right|$$

a discriminator, the discriminator being configured to determine whether the filtered signal has a value function of the amplitude above a fixed threshold.

2. The receiver according to claim 1, wherein the difference between $\lambda_{LO}$ and $\lambda_{wp}$ is such that:

$$\frac{1}{T} < \left| \frac{c}{\lambda_{wp}} - \frac{c}{\lambda_{LO}} \right| \le 10 \text{ GHz}$$

3. A receiver for receiving weak pulses in a quantum key distribution system with discrete-variable encoding, the receiver comprising:

an optical coupler having a first and a second input and first and second outputs, the optical coupler being adapted to be connected to a quantum channel to receive the weak pulses at the first input, each weak pulse having duration T and wavelength $\lambda_{wp}$, and local oscillator signals at the second input;

a local oscillator laser adapted to generate the local oscillator signals, each local oscillator signal being an impulse of duration T and wavelength $\lambda_{LO}$ identical to $\lambda_{wp}$;

a phase variator, the phase variator being adapted to modulate, with a modulation frequency, the phase of the weak pulse or of the local oscillator signal before they interfere in the optical coupler;

a synchronizer connected to the local oscillator laser so that the local oscillator laser emits a local oscillator signal at a given time for which the weak pulse and the local oscillator signal reach the first and second input, respectively, at the same time;

a first and a second photodetector, the first and second photodetectors being connected to the first and second outputs, respectively, of the optical coupler and emitting a first and a second electric signal, the first and second electric signal being function of the interference between the weak pulse and the local oscillator signal in the optical coupler;

an electronic circuit configured to obtain a difference signal, the difference signal being function of the difference between the first electric signal emitted by the first photodetector and the second electric signal emitted by the second photodetector;

a filter adapted to filter the difference signal, generating a filtered signal that includes a portion of the difference signal having a frequency in a frequency range around the modulation frequency that was previously applied by the phase variator;

a discriminator, the discriminator being configured to determine whether the filtered signal has a value function of the amplitude above a fixed threshold.

4. The receiver according to claim 3, wherein the phase variator is configured to vary the phase of the local oscillator signal.

5. The receiver according to claim 1, further comprising an amplifier positioned at an output of the electronic circuit configured to amplify the difference signal.

6. The receiver according to claim 1, wherein the first and second photodetectors are a P-I-N photodetectors.

7. The receiver according to claim 1, wherein the filter comprises a pass band filter.

8. The receiver according to one or more of the preceding claims, claim 1, wherein the optical coupler is an 50% optical coupler.

9. A method to detect the presence or the absence of weak pulses in a quantum key distribution system with discrete-variable encoding, the method comprising:

receiving a weak pulse from a quantum channel having duration T and wavelength $\lambda_{wp}$;

generating a local oscillator signal having duration T and wavelength $\lambda_{LO}$, wherein the difference between $\lambda_{LO}$ and $\lambda_{wp}$ is such that:

$$\frac{1}{T} < \left| \frac{c}{\lambda_{wp}} - \frac{c}{\lambda_{LO}} \right| \leq 100 \text{ GHz};$$

keeping the difference between $\lambda_{LO}$ and $\lambda_{wp}$ constant in time;

inputting to a first and second input of an optical coupler at the same time the weak pulse and the local oscillator signal;

creating an interference signal between the weak pulse and the local oscillator signal using the optical coupler;

detecting the interference signal at a first and at a second output of the optical coupler;

emitting a first and a second electric signal function of the detected interference signal;

subtracting the first and the second electric signal obtaining a difference signal;

filtering the difference signal generating a filtered signal which includes a portion of the difference signal having a frequency in a frequency range around a carrier frequency $$f = \left| \frac{c}{\lambda_{wp}} - \frac{c}{\lambda_{LO}} \right|$$

comparing the filtered signal with a threshold; and determining that a weak pulse has been received if a parameter of the filtered signal is above the threshold.

10. The method according to claim 9, wherein the difference between $\lambda_{LO}$ and $\lambda_{wp}$ is such that:

$$\frac{1}{T} < \left| \frac{c}{\lambda_{wp}} - \frac{c}{\lambda_{LO}} \right| \leq 10 \text{ GHz}.$$

11. A method to detect the presence or the absence of weak pulses in a quantum key distribution system with discrete-variable encoding, the method comprising:

receiving a weak pulse from a quantum channel having duration T and wavelength $\lambda_{wp}$;

generating a local oscillator signal having duration T and wavelength $\lambda_{LO}$ identical to $\lambda_{wp}$;

inputting to a first and second input of an optical coupler at the same time the weak pulse and the local oscillator signal;

creating an interference signal between the weak pulse and the local oscillator signal using the optical coupler;

modulating the phase of the weak pulse or of the local oscillator signal before interference in the optical coupler, resulting in a modulated interference signal;

detecting the interference signal at a first and at a second output of the optical coupler;

emitting a first and a second electric signal function of the detected interference signal;

subtracting the first and the second electric signal obtaining a difference signal;

filtering the difference signal generating a filtered signal which includes a portion of the difference signal having a frequency in a frequency range around the modulation frequency;

comparing the filtered signal with a threshold; and determining that a weak pulse has been received if a parameter of the filtered signal is above the threshold.

12. The method according to claim 9, wherein the duration T is comprised between 100 picoseconds and 10 nanoseconds.

13. The method according to claim 9, wherein the carrier frequency or the modulation frequency is bigger greater than 1/T.

14. The method according to claim 9, wherein the wavelength of the weak pulse $\lambda_{cs}$ is comprised between 800 nm and 1625 nm.

15. The method according to claim 9, wherein the frequency range is comprised in 0.1 KHz and 100 GHZ.

16. The method according to claim 9, wherein the carrier frequency or the modulation frequency f is comprised between 1 GHZ and 100 GHz.

17. The method according to claim 9, wherein the optical coupler is an 50% optical coupler.

18. The method according to claim 9, wherein the parameter of the filtered signal is the amplitude or the intensity of the filtered signal.

* * * * *